(12) United States Patent
Nummila-Pakarinen et al.

(10) Patent No.: US 10,745,498 B2
(45) Date of Patent: *Aug. 18, 2020

(54) ETHYLENE POLYMERS FOR EXTRUSION COATING

(71) Applicant: BOREALIS AG, Vienna (AT)

(72) Inventors: Auli Nummila-Pakarinen, Porvoo (FI);
Bernt-Ake Sultan, Stenungsund (SE);
Bjorn Voigt, Hisings Backa (SE);
Martin Anker, Hisings Karra (SE);
Mattias Bergqvist, Gothenburg (SE);
Thomas Gkourmpis, Gothenburg (SE);
Thomas Hjertberg, Kungshamn (SE);
Gabriel Ruess, Vienna (AT)

(73) Assignee: Borealis AG, Vienna (AT)

( * ) Notice: Subject to any disclaimer, the term of this patent is extended or adjusted under 35 U.S.C. 154(b) by 820 days.

This patent is subject to a terminal disclaimer.

(21) Appl. No.: 14/403,985

(22) PCT Filed: Dec. 7, 2012

(86) PCT No.: PCT/EP2012/005071
§ 371 (c)(1),
(2) Date: Nov. 25, 2014

(87) PCT Pub. No.: WO2013/178241
PCT Pub. Date: Dec. 5, 2013

(65) Prior Publication Data
US 2015/0210785 A1  Jul. 30, 2015

(30) Foreign Application Priority Data
May 31, 2012 (EP) .................................. 12170198

(51) Int. Cl.
*C08F 10/02* (2006.01)
*B29C 48/15* (2019.01)
(Continued)

(52) U.S. Cl.
CPC .............. *C08F 10/02* (2013.01); *B29C 48/15* (2019.02); *C08F 110/02* (2013.01);
(Continued)

(58) Field of Classification Search
None
See application file for complete search history.

(56) References Cited

U.S. PATENT DOCUMENTS

| | | | |
|---|---|---|---|
| 6,521,734 B1 * | 2/2003 | Araki | ...................... B32B 27/32 526/227 |
| 9,243,087 B2 | 1/2016 | Karjala et al. | |
| 2009/0156749 A1 * | 6/2009 | Nummila-Pakarinen | ..................... C08F 10/02 525/240 |

FOREIGN PATENT DOCUMENTS

| | | |
|---|---|---|
| EP | 2077296 A1 | 7/2009 |
| EP | 2123707 A1 | 11/2009 |

(Continued)

OTHER PUBLICATIONS

International Preliminary Report on Patentability for International Application No. PCT/EP2012/005071 dated Dec. 2, 2014.
(Continued)

*Primary Examiner* — Rachel Kahn
(74) *Attorney, Agent, or Firm* — Insigne LLP (57) ABSTRACT

The present invention relates to low density polyethylene having a melt flow rate (MFR) according to ISO 1133 (190° C., 2.16 kg) which is higher than 4.0 g/10 min, a storage modulus G', measured at a loss modulus G" of 5 kPa, which is above 3000 Pa and a vinylidene content which is at least 24/100 k C, compositions, a process for production of the low density polyethylene, a low density polyethylene which is obtainable by the process, a continuous ethylene polymerization method for introducing vinylidene in a low density polyethylene, a method for an extrusion coating process or
(Continued)

an extrusion lamination process, an article, e.g. an extrusion article, an extrusion lamination article, film blowing article, film casting article, wire and cable extrusion article, injection moulding article, blow moulding article or pipe extrusion article, and uses of the low density polyethylene.

11 Claims, 2 Drawing Sheets

(51) Int. Cl.
 *B29K 23/00* (2006.01)
 *C08F 110/02* (2006.01)
(52) U.S. Cl.
 CPC ... *B29K 2023/0633* (2013.01); *Y10T 428/139* (2015.01); *Y10T 428/294* (2015.01)

(56) References Cited

FOREIGN PATENT DOCUMENTS

| | | |
|---|---|---|
| EP | 2239283 A1 | 10/2010 |
| KR | 10-2012-0036832 A | 4/2012 |
| WO | 03066698 A1 | 8/2003 |
| WO | 2005002744 A1 | 1/2005 |
| WO | 2007045315 A1 | 4/2007 |
| WO | 2013078018 A2 | 5/2013 |
| WO | 2013083285 A1 | 6/2013 |

OTHER PUBLICATIONS

International Search Report of International Application No. PCT/EP2012/005072 dated Jul. 12, 2012.
Vieweg et al., "Kunststoff Handbuch, Band IV, Polyolefine," 1969, pp. 412-420.
Raff et al., "Crystalline Olefin Polymers," Part II, 1964, pp. 478-484.
Rosato, "Coating", Plastics Processing Data Handbook, 1997, pp. 273-277.
Jackson et al., "Molecular Weight Sensitive Detectors," Handbook of Size Exclusion Chromatography and Related Techniques, C.-S. Wu, 2nd ed., 2004, pp. 99-104.
Heino et al., "Rheological Characterization of Polyethylene Fractions," Theor. Appl. Rheol., Proc. Int. Congr. Rheol, 11th Edition, No. 1, 1992, pp. 360-362.
Heino, "The Influence of Molecular Structure on Some Rheological Properties of Polyethylene," Annual Transactions of the Nordic Rheology Society, vol. 3, 1995.
Kaye et al., "Definition of Terms Relating to the Non-Ultimate Mechanical Properties of Polymers," Pure & Appl. Chem., vol. 70, No. 3, 1998, pp. 701-754.
He et al., "Unexpected proton spin-lattice relaxation in the solutions of polyolefin and tetrachloroethane", Mag. Res. Chem., 2010, 48, pp. 537-542.
Busico et al., "H NMR Analysis of Chain Unsaturations in Ethene/1-Octene Copolymers Prepared with Metallocene Catalysts at High Temperature", Macromolecules, vol. 38, No. 16, 2005, pp. 6988-6996.
Notice of Opposition issued in European Patent No. 2855537, filed Apr. 19, 2018.
U.S. Appl. No. 61/563,186 priority document, filed Nov. 23, 2011; submitted with Notice of Opposition issued in European Patent No. 2855537, filed Apr. 19, 2018.
Declaration of Dr. Teresa Plumley Karjala and Dr. Jaap den Doelder on WO2013/078018; submitted with Notice of Opposition issued in European Patent No. 2855537, filed Apr. 19, 2018.
The Material Guidebook for Converting 2004, Converting Technical Institute, 2003, Japan, pp. 272-275; submitted with Notice of Opposition issued in European Patent No. 2855537, filed Apr. 19, 2018.
Declaration of Mr. Yutaka Maehara on LDPE NUC-8007; submitted with Notice of Opposition issued in European Patent No. 2855537, filed Apr. 19, 2018.
Material Safety Data Sheet on DOW® NUC™-8007, issued May 3, 2010, printed Aug. 15, 2011; submitted with Notice of Opposition issued in European Patent No. 2855537, filed Apr. 19, 2018.
LDPE Product Listing for Extrusion Coating Applications published by NUC before Jun. 2007; submitted with Notice of Opposition issued in European Patent No. 2855537, filed Apr. 19, 2018.
The Dow Chemical Company; Invoice No. 38/88072156; submitted with Notice of Opposition issued in European Patent No. 2855537, filed Apr. 19, 2018.
Database print screens related to The Dow Chemical Company; Invoice No. 38/88072156; submitted with Notice of Opposition issued in European Patent No. 2855537, filed Apr. 19, 2018.
The Dow Chemical Company; Invoice No. 38/88072328; submitted with Notice of Opposition issued in European Patent No. 2855537, filed Apr. 19, 2018.
Database print screens related to The Dow Chemical Company; Invoice No. 38/88072328; submitted with Notice of Opposition issued in European Patent No. 2855537, filed Apr. 19, 2018.
E-mail of Dr. Jian Wang, dated May 11, 2012; submitted with Notice of Opposition issued in European Patent No. 2855537, filed Apr. 19, 2018.
Analytical report "Performance Plastics 2012, Stronger Together, LDPE NUC-8007 resin analysis, an extrusion coating grade LDPE made in tubular reactor at Nippon Unicar (a Dow JV in Japan)" The Dow Chemical Company, attached to Dr. Jian Wang's e-mail of May 11, 2012; submitted with Notice of Opposition issued in European Patent No. 2855537, filed Apr. 19, 2018.
Declaration of Dr. Teresa Plumley Karjala on NUC-8007; submitted with Notice of Opposition issued in European Patent No. 2855537, filed Apr. 19, 2018.
Dilhan M. Kalyon et al., "High Pressure Polymerization of Ethylene and Rheological Behavior of Polyethylene Product", Polymer Engineering and Science, May 1994, vol. 34, No. 10, pp. 804-814.
Choon K. Chai et al.; "Rheological Study of Melt Elasticity on Extrusion Coating with Polyethylenes"; TAPPI 9th European Place Conference; Rome, Italy; May 12-14, 2003.
The Opposition issued by European Patent Office in Application No. 12798164.5 dated Sep. 5, 2019, 5 pages.
Masayoshi, Araki, "Plastic Film—Resin Material Guide Book 2004", The Material Guidebook for Converting, Converting Technical Institute, 2003, Printed in Japan, ISBN4-906451-30-6 C3058, 10 pages.
Gregory, B.H., "Extrusion Coating—A Process Manual", Trafford Publishing, USA, 2010, 6 pages.

* cited by examiner

ETHYLENE POLYMERS FOR EXTRUSION COATING

FIELD OF THE INVENTION

The present invention relates to a new low density polyethylene, compositions, a process for production of the low density polyethylene, a low density polyethylene which is obtainable by the process, a continuous ethylene polymerization method for introducing vinylidene in a low density polyethylene, a method for an extrusion coating process or an extrusion lamination process, an article, e.g. an extrusion article, film blowing article, an extrusion lamination article, film casting article, wire and cable extrusion article, injection moulding article, blow moulding article or pipe extrusion article, and use in extrusion coating, extrusion lamination, film blowing, film casting, wire and cable extrusion, injection moulding, blow moulding or pipe extrusion.

BACKGROUND OF THE INVENTION

Low density polyethylene (LDPE), i.e. a polyethylene with a density range of 910-940 kg/m$^3$, is an important thermoplastic polymer and is of practical use in many industrial applications. Conventional low density polyethylene is produced by a high pressure process at a high temperature via free radical polymerization. Autoclave and tubular reactors are the two types of high pressure reactors which are predominantly used for producing low density polyethylene.

Further, in extrusion coating a thin film of polymer melt is extruded through a flat die and pressed onto a moving substrate. Extrusion coating is discussed, among others, in Vieweg, Schley and Schwarz: Kunststoff Handbuch, Band IV, Polyolefine, Carl Hanser Verlag (1969), pages 412 to 420. The substrate may be, among others, paper, paperboard, a plastic film or a metal film. The line speed in modern equipment can often be above 300 m/min or above 350 m/min.

Higher line speed sets heavy requirements for the material. Especially draw resonance is a problem often encountered with linear polymers, such as linear low density polyethylene (LLDPE), high density polyethylene (HDPE) or polypropylene (PP). At the onset of draw resonance large oscillations occur in the flow of the polymer melt through the die. Consequently, the coating becomes uneven. The draw resonance is due to the "tension thinning" behaviour of the linear polymers, where the elongational viscosity decreases with increasing tensile strain rate. On the other hand, highly branched polymers like low density polyethylene exhibit strain hardening, where the elongational viscosity increases with increasing tensile strain rate.

The two most important variables defining the processability of a polymer used for extrusion coating is its draw-down (DD) and neck-in (NI). The value of draw-down should be as high as possible in order to obtain as thin as possible coating layer and to allow a high production speed. At the same time it is desirable to have polymers with a low neck-in value. This first of all leads to a broader covering of the substrate, but also to less needs to trim away the outer part of the coated substrate. The latter is related to a phenomenon giving thicker edges of the melt film, "edge-bead". With increasing neck-in this thickening will increase and a larger part of the polymer and substrate must be trimmed away. Further web stability at high line speeds is critical for obtaining extrusion coated surfaces with even coating weight.

Traditionally, the autoclave materials, here low density polyethylenes produced in a stirred autoclave reactor, have superior processability for extrusion coating together with satisfactory end product properties. The autoclave materials exhibit a pronounced high molecular weight tail and have a good neck-in draw down balance. Tubular materials, here low density polyethylenes produced in a tubular reactor, have hitherto, due to plug flow in the reactor, not shown such a pronounced high molecular weight tail, which is usually found in materials produced in autoclave reactors. Thus, the tubular materials have hitherto not shown a good neck-in draw down balance. Especially the neck-in will be high with a tubular material and web stability will also be lower. In order to have a advantageous neck-in draw down balance and a web stability at high line speeds, the tubular material must have a high storage modulus G', measured at a loss modulus G" of 5 kPa.

Further, since autoclave plants are getting older, and there are not many new autoclave reactors being built in the world there is a need for alternative technology giving same processability. However, as described above, traditionally produced tubular LDPE polymers have not fulfilled the requirements set for processability. Thus, there is a need for new polymer structures from tubular reactor with advantageous properties to meet the requirements of draw-down and neck-in and web stability.

DESCRIPTION OF THE INVENTION

The present invention relates to a low density polyethylene having a melt flow rate (MFR) according to ISO 1133 (190° C., 2.16 kg) which is higher than 4.0 g/10 min, a storage modulus G', measured at a loss modulus G" of 5 kPa, which is above 3000 Pa and a vinylidene content which is at least 24/100 k C.

The low density polyethylene of the present invention have been produced in a tubular reactor by radical initiated polymerization where the polymerization is performed by reacting the ethylene monomers under the action of one or more radical initiators, such as peroxides, oxygen or combinations thereof, wherein the amount of used radical initiators, i.e. the amount of used active oxygen is at least 5 times the conventionally used amount. By selecting the amount of used radical initiators in the polymerization we have surprisingly been able to produce a low density polyethylene showing advantageous properties. Thus, for example, the storage modulus G', measured at a loss modulus G" of 5 kPa, has shown to be generally higher for the low density polyethylene of the present invention than standard tubular materials (low density polyethylenes) produced with conventional techniques. As stated above, a tubular material must have a high storage modulus G', measured at a loss modulus G" of 5 kPa, in order to have a advantageous neck-in draw down balance and a web stability at high line speeds.

Further, from the Examples A to F, see Table 10, it is also clear that neck-in is reduced by increased G' (5 kPa). Consequently, the processability of the low density polyethylene is improved with increased active oxygen feed. At the higher active oxygen feed the low density polyethylene of the present invention produced in a tubular reactor surprisingly has a draw-down neck-in balance similar to the draw-down neck-in balance that is earlier only known from traditional extrusion coating materials produced in autoclave reactor.

The new low density polyethylene of the present invention exhibits advantageous processability properties, e.g.

improved extrusion coating properties compared to a regular tubular material. Further, the low density polyethylene of the present invention may be comprised in materials useful as melt strength modifier. Linear polyethylenes without long chain branches have for some applications insufficient melt strength, highly branched LDPE are then usually added to increase the melt strength. Traditionally autoclave materials are used but the new low density polyethylene of the present invention, from a tubular reactor origin, can surprisingly also be used as melt strength modifier.

The low density polyethylene of the present invention is a polyethylene having a density in the interval of 910-940 kg/m$^3$, e.g. in the interval of 910-935 kg/m$^3$.

Further, the low density polyethylene of the present invention is also a polyethylene having a density in the interval of 900-935 kg/m$^3$, e.g. in the interval of 910-935 kg/m$^3$.

Further, the low density polyethylene of the present invention has a storage modulus G', measured at a loss modulus G" of 5 kPa, which is above 3000 Pa.

In a further embodiment the low density polyethylene of the present invention has a storage modulus G', measured at a loss modulus G" of 5 kPa, which is above 3100 Pa.

In still a further embodiment the low density polyethylene of the present invention has a storage modulus G', measured at a loss modulus G" of 5 kPa, which is above 3200 Pa.

Still a further embodiment of the present invention provides a low density polyethylene which has a storage modulus G', measured at a loss modulus G" of 5 kPa, which is above 3300 Pa.

In a further embodiment the low density polyethylene of the present invention has a storage modulus G', measured at a loss modulus G" of 5 kPa, which is above 3400 Pa.

In an even further embodiment the low density polyethylene of the present invention has a storage modulus G', measured at a loss modulus G" of 5 kPa, which is above 3450 Pa.

In still a further embodiment the low density polyethylene of the present invention has a storage modulus G', measured at a loss modulus G" of 5 kPa, which is above 3500 Pa.

Further, suitable upper storage modulus G', measured at a loss modulus G" of 5 kPa, limits of storage modulus G', measured at a loss modulus G" of 5 kPa, intervals may be 3800, 3750, 3700, 3650, 3600 or, alternatively 3550 Pa, and these upper storage modulus G', measured at a loss modulus G" of 5 kPa, limits may each be used in any storage modulus G', measured at a loss modulus G' of 5 kPa, interval, open or closed, as described herein, i.e. used in combination with the given lower storage modulus G', measured at a loss modulus G" of 5 kPa, limit of any storage modulus G', measured at a loss modulus G" of 5 kPa, interval, as described herein.

Vinylidene is formed by beta-scission of tertiary carbon radicals. With increased branching by higher radical initiator amount, the number of tertiary carbon radicals will increase and also the probability of beta-scission and creation of a vinylidene. The vinylidene content will then be an indirect measurement on the amount of introduced branches in the low density polyethylene of the present invention.

The branching originates from radical transfer to the polymer backbone. These transfer reactions are necessary for differentiation of the molecular weights between the chains, propagation leading to long-chain branching or termination via combination leading to two chains is merged into one. The introduction of long chain branching and high molecular weight material, make the material, here the low density polyethylene of the present invention, exhibiting entanglements in the melt which leads to higher melt elasticity (reduced neck-in).

The new low density polyethylene of the present invention exhibits advantageous processability properties, e.g. improved extrusion coating properties and/or improved extrusion lamination properties, compared to a regular tubular material. Further, the low density polyethylene of the present invention may be comprised in materials useful as melt strength modifier. Linear polyethylenes without long chain branches have for some applications insufficient melt strength, highly branched LDPE are then usually added to increase the melt strength. Traditionally autoclave materials are used but the new low density polyethylene of the present invention, from a tubular reactor origin, can surprisingly also be used as melt strength modifier.

A further embodiment of the present invention provides a low density polyethylene, as described herein, wherein the low density polyethylene is a homopolymer of ethylene.

Still a further embodiment of the present invention provides a low density polyethylene, as described herein, wherein the low density polyethylene has a density in the interval of 900-935 kg/m$^3$, e.g. in the interval of 910-935 kg/m$^3$.

In a further embodiment the low density polyethylene of the present invention, as described herein, has a vinylidene content which is at least 25/100 k C.

In still a further embodiment the low density polyethylene of the present invention, as described herein, has a vinylidene content which is at least 26/100 k C.

Still a further embodiment of the present invention provides a low density polyethylene wherein the vinylidene content is at least 27/100 k C.

In a further embodiment of the present invention a low density polyethylene is provided wherein the vinylidene content is at least 28/100 k C.

An even further embodiment of the present invention provides a low density polyethylene wherein the vinylidene content is at least 29/100 k C.

In a further embodiment the low density polyethylene of the present invention has a vinylidene content which is at least 30/100 k C.

Further, suitable upper vinylidene content limits of vinylidene content intervals may be 38, 36, 34, or, alternatively 33, and these upper vinylidene content limits may each be used in any vinylidene content interval, open or closed, as described herein, i.e. used in combination with the given lower vinylidene content limit of any vinylidene content interval, as described herein.

Further, the low density polyethylene of the present invention has a melt flow rate (MFR) according to ISO 1133 (190° C., 2.16 kg) which is higher than 4.0 g/10 min.

In a further embodiment the low density polyethylene of the present invention has a melt flow rate (MFR) according to ISO 1133 (190° C., 2.16 kg) which is at least 4.2 g/10 min.

In still a further embodiment the low density polyethylene of the present invention has a melt flow rate (MFR) according to ISO 1133 (190° C., 2.16 kg) which is at least 4.4 g/10 min.

Still a further embodiment of the present invention provides a low density polyethylene which has a melt flow rate (MFR) according to ISO 1133 (190° C., 2.16 kg) which is at least 4.6 g/10 min.

In a further embodiment the low density polyethylene of the present invention has a melt flow rate (MFR) according to ISO 1133 (190° C., 2.16 kg) which is at least 4.8 g/10 min.

In an even further embodiment the low density polyethylene of the present invention has a melt flow rate (MFR) according to ISO 1133 (190° C., 2.16 kg) which is at least 5.0 g/10 min.

In still a further embodiment the low density polyethylene of the present invention has a melt flow rate (MFR) according to ISO 1133 (190° C., 2.16 kg) which is no more than 20 g/10 min.

In a further embodiment the low density polyethylene of the present invention has a melt flow rate (MFR) according to ISO 1133 (190° C., 2.16 kg) which is no more than 19 g/10 min.

In even a further embodiment the low density polyethylene of the present invention has a melt flow rate (MFR) according to ISO 1133 (190° C., 2.16 kg) which is no more than 18 g/10 min.

In still a further embodiment of the present invention, the low density polyethylene is produced in a tubular reactor by radical initiated polymerization, where the polymerization is performed by reacting a reaction mixture, comprising ethylene monomers, under action of one or more radical initiators, such as peroxides, oxygen or combinations thereof, wherein the amount of used radical initiators, i.e. the amount of used active oxygen, is at least 5 times the conventionally used amount, and wherein the inlet temperature of the reaction mixture into the first reaction zone of the reactor is 135° C. or lower, or, alternatively, from 120 to 135° C.

Further, suitable lower temperature limits of inlet temperature intervals may be 115, 116, 117, 118, 119, 120, 121 or, alternatively 122° C., and these lower temperature limits may each be used in any inlet temperature interval, open or closed, as described herein, i.e. used in combination with the given upper temperature limit of any inlet temperature interval, as described herein.

The reaction mixture, which is compressed, comprises ethylene monomers and, optionally, chain transfer agents and/or, optionally, other processing aids.

The inlet temperature is the temperature of the reaction mixture at the moment when it enters into the first reaction zone of the reactor.

The first reaction zone is defined as the part of the reactor reaching from the position in the reactor, where the reaction mixture first comes in contact with the initiator mixture at the first initiator mixture inlet, to the position in the reactor of the second initiator mixture inlet.

Methods to determine the temperature of a reaction mixture in a tubular reactor are known in the art. Usually the temperature of a reaction mixture is measured inside the vessel, which contains the reaction mixture, at a distance to the walls of the vessels of 2 cm or more. A probe, such as a thermocouple, may be used to measure the temperature. In the case where the vessel is a circular object, such as a tube, the temperature is usually measured inside the vessel at a distance from the walls of the vessel of at least 1/10 of the inner diameter of the vessel. As will be readily appreciated, the maximum distance to the walls of a circular vessel is ½ of the inner diameter of the vessel. Preferably, the maximum distance to the walls of a circular vessel, where the temperature should be measured, should be ⅓, or less, of the inner diameter of the vessel.

By selecting the inlet temperature into the first reaction zone of the reactor we have surprisingly been able to produce a low density polyethylene showing advantageous properties.

Furthermore, the low density polyethylene of the present invention, which is produced, by selecting the amount of used radical initiators in the polymerization, i.e. the amount of used active oxygen is at least 5 times the conventionally used amount, and at low inlet temperature, i.e. 135° C. or lower, or, alternatively, from 120 to 135° C., has surprisingly shown even further advantageous properties. Thus, for example, the storage modulus G', measured at a loss modulus G" of 5 kPa, has shown to be even higher for the low density polyethylene of the present invention produced at the low inlet temperature, see, for example, Example A, Table 10, at an inlet temperature of 124° C. Further, it is also clear that neck-in is even further reduced in Example A, see Table 10.

This is shown by the higher storage modulus G', measured at a loss modulus G" of 5 kPa, compared to materials produced with a higher inlet temperature (see, Table 10). The increase in the storage modulus G', measured at a loss modulus G" of 5 kPa, seems to be more dependent on the inlet temperature instead of, for instance, high peak temperatures (see Table 2-10).

Further, an unexpectingly high storage modulus G', measured at a loss modulus G" of 5 kPa, has, according to the invention, surprisingly been achieved in polymerization in a tubular reactor wherein the amount of used radical initiators, i.e. the amount of used active oxygen is at least 5 times the conventionally used amount, and further also by having a lower inlet temperature into the first reaction zone.

A further embodiment of the present invention provides a low density polyethylene, as described herein, wherein the low density polyethylene is produced in a tubular reactor.

A low density polyethylene which is produced in a tubular reactor will have a molecular weight distribution without the pronounced high molecular weight tail present in autoclave materials. This difference in the appearance of the molecular weight distribution is expected and detectable to a person skilled in the art.

Still a further embodiment of the present invention provides a low density polyethylene, as described herein, wherein the low density polyethylene has a molecular weight distribution Mw/Mn which is at least 14.

Mn is the number average molecular weight and Mw is the weight average molecular weight. Mw and Mn are determined according to methods known in the art of Gel Permeation Chromatography (GPC). For branched materials the average molecular weight is determined by the aid of light scattering since the branched structure do not elute according to molecular weight as for linear materials.

The molecular weight distribution (Mw/Mn), which is also called MWD or PDI (polydispersity index), is a key parameter for extrusion coating properties and extrusion lamination properties. For the neck-in it is required a high molecular weight material with a slow relaxation in the gap of the extrusion coating equipment but for high throughput in extruder and for high drawdown speed a low molecular weight part must be present.

In a further embodiment the low density polyethylene of the present invention has a molecular weight distribution Mw/Mn which is at least 16.

In still a further embodiment the molecular weight distribution Mw/Mn is at least 17.

Still a further embodiment of the present invention provides a low density polyethylene wherein the molecular weight distribution Mw/Mn is at least 18.

An even further embodiment of the present invention provides a low density polyethylene of the present invention wherein the molecular weight distribution Mw/Mn is at least 19.

In a further embodiment the low density polyethylene of the present invention has a molecular weight distribution Mw/Mn which is at least 20.

In still a further embodiment the molecular weight distribution Mw/Mn is at least 21.

Still a further embodiment of the present invention provides a low density polyethylene wherein the molecular weight distribution Mw/Mn is at least 22.

An even further embodiment of the present invention provides a low density polyethylene of the present invention wherein the molecular weight distribution Mw/Mn is at least 23.

In still a further embodiment the molecular weight distribution Mw/Mn is at least 24.

Still a further embodiment of the present invention provides a low density polyethylene, as described herein, wherein the low density polyethylene has a molecular weight distribution Mw/Mn which is at least 25.

Further, suitable upper molecular weight distribution limits of molecular weight distribution intervals may be 30, 29, 28, 27 or, alternatively 25, and these upper molecular weight distribution limits may each be used in any molecular weight distribution interval, open or closed, as described herein, i.e. used in combination with the given lower molecular weight distribution limit of any molecular weight distribution interval, as described herein.

The present invention also relates to compositions comprising the low density polyethylene, which compositions may be useful in extrusion coating and/or extrusion lamination. There are commercially available polypropylene, linear low density and high density polyethylene grades for extrusion coating where improved processability is achieved by modifying them with autoclave LDPE. A tubular LDPE with suitable melt elasticity can be used for same purpose.

In a further aspect, the present invention relates to a composition comprising the new low density polyethylene, which composition may be useful in extrusion coating processes and/or extrusion lamination processes.

Accordingly, the present invention provides a composition, useful in extrusion coating processes and/or extrusion lamination processes, which composition comprises the low density polyethylene of the present invention, and, optionally, additionally further components, e.g. olefin polymers such as polyethylene or polypropylene, for example, linear homopolymers of ethylene and/or copolymers of ethylene and one or more alpha-olefin comonomers having from 3 to 20 carbon atoms. Homo- and copolymers of ethylene, homo- and copolymers of propylene and homo- and copolymers of 1-butene are also examples of further components. Said olefin polymers may be produced by polymerising olefins in the presence of transition metal polymerisation catalysts. Further components include, e.g., bimodal copolymers of ethylene and at least two alpha-olefin comonomers, like those disclosed in WO 2005/002744 and WO 03/66698.

Furthermore, examples of such further components may be, e.g., olefin polymers such as homo- and copolymers of ethylene, homo- and copolymers of propylene and homo- and copolymers of 1-butene.

In an even further aspect, the present invention relates to a composition, as described herein, which may comprise the low density polyethylene of the present invention in an amount of 5 to 40 wt %, based on the total weight of the composition, and may further comprise at least one olefin polymer prepared in the presence of a transition metal catalyst, which at least one olefin polymer may be selected from homo- or copolymers of polyethylene, polypropylene or poly-1-butene.

Furthermore, the composition of the present invention may further comprise antioxidants, stabilizers, other additives and fillers, which are all known in the art.

The composition of the present invention, useful in extrusion coating processes and/or extrusion lamination processes, may include the new low density polyethylene in an amount of from 5 to 40% by weight, based on the total weight of the composition. In a further embodiments the composition may comprise from 10 to 35% by weight, or alternatively from 20 to 35% by weight, of the new low density polyethylene. Furthermore, in addition to the new low density polyethylene, the composition may further comprise of from 60 to 95% by weight, for example, from 65 to 90%, and e.g. from 65 to 80% of at least one further component selected from a linear ethylene homopolymer, and a copolymer of ethylene with one or more alpha-olefin comonomers having from 3 to 20 carbon atoms.

A further embodiment of the invention provides a composition comprising
the low density polyethylene of the present invention, and
at least one olefin polymer prepared in the presence of a transition metal catalyst, wherein the olefin polymer may be selected from homo- or copolymers of polyethylene, polypropylene or poly-1-butene, and the low density polyethylene may be present in an amount of 5 to 40 wt %, based on the total weight of the composition.

In line with the present invention, the composition can be processed in an extrusion coating line with a high line speed and minimum risk of draw resonance.

The compositions of the present invention can be extrusion coated to different substrates at high line speeds and the compositions may have a reduced tendency to undergo draw resonance and an even distribution of the coating may be obtained. This would allow a high throughput in the coating line with a maintained good product quality. Thus, the low density polyethylene according to the present invention can be used to make compositions which may exhibit an excellent processability. On the other hand, any advantageous properties of any other composition components present in the composition may be maintained. Therefore, the low density polyethylene according to present invention can be used to improve the processability of different compositions having various advantageous properties, such as good optical properties, good sealing properties and good abrasion resistance. Further still, the compositions of the present invention may have a low neck-in and excellent processability at high line speeds (meaning high draw-down and web stability) when used in extrusion coating. In particular, the neck-in decreases when the line speed increases, which results in better coating performance at higher throughput. A low neck-in leads to a low amount of wasted substrate material, as the uncoated part of the substrate needs to be cut off and discarded. The substrate to be coated can be any substrate known in the art, such as paper, paperboard, Kraft paper, metal foil, plastic foil and cellophane foil. To improve the adhesion between the substrate and a the coating polymer layer the methods commonly known in the art may be used, such as ozone treatment of the molten polymer film, flame treatment and corona treatment of the substrate, an adhesive layer may be used, and an adhesion promoter may be used.

A further object of the invention is a process for production of a low density polyethylene, of the present invention, in a tubular reactor by radical initiated polymerization under high pressure, wherein the polymerization is performed by reacting a reaction mixture, comprising ethylene monomers, under action of one or more radical initiators, such as peroxides, oxygen or combinations thereof, wherein the amount of used radical initiators, i.e. the amount of used active oxygen is at least 5 times the conventionally used amount, and, optionally, wherein inlet temperature of the reaction mixture into the first reaction zone of the reactor is 135° C. or lower, or, alternatively, from 120 to 135° C.

Still a further object of the invention is a process for production of a low density polyethylene, of the present invention, in a tubular reactor by radical initiated polymerization under high pressure, which pressure is from 1000 to 3000 bar, e.g. from 1500 to 2500 bar, wherein the polymerization is performed by reacting a reaction mixture, comprising ethylene monomers, under action of one or more radical initiators, such as peroxides, oxygen or combinations thereof, wherein the amount of used radical initiators, i.e. the amount of used active oxygen is at least 5 times the conventionally used amount, and, optionally, wherein inlet temperature of the reaction mixture into the first reaction zone of the reactor is 135° C. or lower, or, alternatively, from 120 to 135° C.

By selecting the amount of used radical initiators, i.e. the amount of used active oxygen, we have surprisingly been able to produce a low density polyethylene exhibiting advantageous properties.

An even further object of the invention is a process for production of a low density polyethylene, of the present invention, in a tubular reactor by radical initiated polymerization under high pressure, wherein the polymerization is performed by reacting a reaction mixture, comprising ethylene monomers, under action of one or more radical initiators, such as peroxides, oxygen or combinations thereof, wherein the amount of used radical initiators, i.e. the amount of used active oxygen is at least 5 times the conventionally used amount, and wherein the inlet temperature of the reaction mixture into the first reaction zone of the reactor is 135° C. or lower, or, alternatively, from 120 to 135° C.

Still an even further object of the invention is a process for production of a low density polyethylene, of the present invention, in a tubular reactor by radical initiated polymerization under high pressure, which pressure is from 1000 to 3000 bar, e.g. from 1500 to 2500 bar, wherein the polymerization is performed by reacting a reaction mixture, comprising ethylene monomers, under action of one or more radical initiators, such as peroxides, oxygen or combinations thereof, wherein the amount of used radical initiators, i.e. the amount of used active oxygen is at least 5 times the conventionally used amount, and wherein the inlet temperature of the reaction mixture into the first reaction zone of the reactor is 135° C. or lower, or, alternatively, from 120 to 135° C.

The reaction mixture and inlet temperature are, both, as defined herein.

By selecting the amount of used radical initiators, i.e. the amount of used active oxygen and by selecting the inlet temperature into the first reaction zone of the reactor to be 135° C. or lower, or, alternatively, from 120 to 135° C., we have surprisingly been able to produce a low density polyethylene exhibiting advantageous properties.

According to embodiments of the present invention "the inlet temperature into the reactor" means the inlet temperature into the first reaction zone of the reactor.

Still a further object of the invention includes a process for production of the low density polyethylene, as described herein, where the inlet temperature into the first reaction zone of the reactor is less than 135° C.

An even further object of the invention includes a process for production of the low density polyethylene, as described herein, where the inlet temperature into the first reaction zone of the reactor is less than 134° C.

In a further embodiment of the present invention, the invention includes a process for production of the low density polyethylene, as described herein, where the inlet temperature into the first reaction zone of the reactor is less than 130° C.

An embodiment of the present invention provides a process for production of the low density polyethylene, as described herein, where the inlet temperature into the first reaction zone of the reactor is less than 128° C.

In a further embodiment of the present invention, the invention includes a process for production of the low density polyethylene, as described herein, where the inlet temperature into the first reaction zone of the reactor is less than 126° C.

An even further embodiment of the present invention provides a process for production of the low density polyethylene, as described herein, where the inlet temperature into the first reaction zone of the reactor is less than 125° C.

A further object of the invention is a process for production of a low density polyethylene, of the present invention, in a tubular reactor by radical initiated polymerization under high pressure, wherein the polymerization is performed by reacting the reaction mixture, comprising ethylene monomers, under the action of one or more radical initiators, such as peroxides, oxygen or combinations thereof, wherein the amount of used radical initiators, i.e. the amount of used active oxygen is at least 5 times the conventionally used amount, and wherein the inlet temperature into the first reaction zone of the reactor is selected, as described in any of the embodiments described herein.

Still a further object of the invention is a process for production of a low density polyethylene, of the present invention, in a tubular reactor by radical initiated polymerization under high pressure, which pressure is from 1000 to 3000 bar, e.g. from 1500 to 2500 bar, wherein the polymerization is performed by reacting the reaction mixture, comprising ethylene monomers, under the action of one or more radical initiators, such as peroxides, oxygen or combinations thereof, wherein the amount of used radical initiators, i.e. the amount of used active oxygen is at least 5 times the conventionally used amount, and wherein the inlet temperature into the first reaction zone of the reactor is selected, as described in any of the embodiments described herein.

An even further object of the invention includes a process for production of the low density polyethylene, of the present invention, in a tubular reactor under high pressure by radical initiated polymerization where the polymerization is performed by reacting the reaction mixture, comprising ethylene monomers, under the action of one or more radical initiators, being peroxides, comprising low temperature decomposition peroxides, e.g., peroxides having a 0.1 hour half-life temperature which is below 100° C., wherein the amount of used radical initiators, i.e. the amount of used active oxygen is at least 5 times the conventionally used amount, and wherein the inlet temperature into the first reaction zone of the reactor is selected, as described in any of the embodiments described herein.

Still an even further object of the invention includes a process for production of the low density polyethylene, of the present invention, in a tubular reactor under high pressure, which pressure is from 1000 to 3000 bar, e.g. from 1500 to 2500 bar, by radical initiated polymerization where the polymerization is performed by reacting the reaction mixture, comprising ethylene monomers, under the action of one or more radical initiators, being peroxides, comprising low temperature decomposition peroxides, e.g., peroxides having a 0.1 hour half-life temperature which is below 100° C., wherein the amount of used radical initiators, i.e. the amount of used active oxygen is at least 5 times the conventionally used amount, and wherein the inlet temperature into the first reaction zone of the reactor is selected, as described in any of the embodiments described herein.

The present invention do also relate to a continuous ethylene polymerization method for producing a low density polyethylene with advantageous properties by introducing a high vinylidene content in a low density polyethylene, wherein vinylidene is introduced by reacting a reaction mixture, comprising ethylene monomers, under the action of one or more radical initiators, such as peroxides, oxygen or combinations thereof, wherein the amount of used radical initiators, i.e. the amount of used active oxygen is at least 5 times the conventionally used amount, and by, optionally, selecting the inlet temperature into the reactor to be 135° C. or lower, or, alternatively, from 120 to 135° C.

Further, a continuous ethylene polymerization method for introducing a vinylidene in a low density polyethylene is disclosed, wherein the amount of used radical initiators, i.e. the amount of used active oxygen is at least 5 times the conventionally used amount, and wherein vinylidene is introduced by selecting an inlet temperature of the reaction mixture into the first reaction zone of the reactor which is 135° C. or lower, or, alternatively, from 120 to 135° C.

Furthermore, the continuous ethylene polymerization, for introducing a high vinylidene content in a low density polyethylene, is a radical initiated polymerization where the polymerization is performed by reacting the reaction mixture, comprising ethylene monomers, under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C.

Still a further object of the invention includes a continuous ethylene polymerization method for introducing a high vinylidene content in a low density polyethylene, as described herein, where the inlet temperature of the reaction mixture into the first reaction zone of the reactor is less than 135° C.

An even further object of the invention includes a continuous ethylene polymerization method for introducing a high vinylidene content in a low density polyethylene, as described herein, where the inlet temperature of the reaction mixture into the first reaction zone of the reactor is less than 134° C.

In a further embodiment of the present invention, the invention includes a continuous ethylene polymerization method for introducing a high vinylidene content in a low density polyethylene, as described herein, where the inlet temperature of the reaction mixture into the first reaction zone of the reactor is less than 130° C.

An embodiment of the present invention provides a continuous ethylene polymerization method for introducing a high vinylidene content in a low density polyethylene, as described herein, where the inlet temperature of the reaction mixture into the first reaction zone of the reactor is less than 128° C., less than 126° C., or, alternatively, less than 125° C.

A further embodiment discloses the continuous ethylene polymerization method for introducing high vinylidene content in a low density polyethylene, the ethylene polymerization is a radical initiated polymerization and the polymerization is performed by reacting the reaction mixture, comprising ethylene monomers, under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the amount of used radical initiators, i.e. the amount of used active oxygen is at least 5 times the conventionally used amount, and wherein the inlet temperature into the first reaction zone of the reactor is selected, as described in any of the embodiments described herein.

Further embodiments disclose a process for production of the low density polyethylene, as described herein, or a continuous ethylene polymerization method, as described herein, wherein the amount of used radical initiators, i.e. the amount of used active oxygen is at least 5 times the conventionally used amount, and wherein, optionally, the inlet temperature into the first reaction zone of the reactor is selected, as described in any of the embodiments described herein, and a radical initiator cocktail is used, which is composed of the following radical initiators, where the 0.1 hours half life temperature (T½) is given for each radical initiator: Initiator A (T½ 0.1 h at 75-90° C. in chlorobenzene), Initiator B (T½ 0.1 h at 80-95° C. in chlorobenzene), Initiator C (T½ 0.1 h at 105-125° C. in chlorobenzene), Initiator D (T½ 0.1 h at 125-140° C. in chlorobenzene), Initiator E (T½ 0.1 h at 130-145° C. in chlorobenzene) and Initator F (T½ 0.1 h at 155-175° C. in chlorobenzene).

A further embodiment discloses a low density polyethylene which is obtainable by the process of the present invention as described herein.

Another object of the invention relates to a method for an extrusion coating process, which method comprises extrusion coating a flat substrate by extruding the low density polyethylene of the invention, or the composition of the invention, in a molten state through a flat die onto said substrate, or a method for an extrusion lamination process utilizing the low density polyethylene of the invention or the composition of the invention.

In an extrusion coating process a substrate is coated with polymer. For the sake of completeness it is stated here that extrusion lamination processes also are included in accordance with the invention and any modification for such a process will be clear to a person skilled in the art. The substrate is typically a fibrous substrate, such as paper, paperboard or Kraft paper or woven or non-woven fabrics; a metal foil, such as aluminum foil; or a plastic film, such as a biaxially oriented polypropylene film, PET film, PA film or cellophane film. Further substrates may also include less flexible substrates, such as substrates comprising thick metal or wood. The polymer is extruded onto the moving substrate through a flat die. After exiting the die the polymer melt is oxidized when it comes into contact with air. The oxidation improves the adhesion between the coating and the substrate.

When the melt exits the die the melt film is pulled down into a nip between two rollers, the pressure roll and the chill roll, situated below the die. The substrate, moving at a velocity which is higher than that of the melt film, draws the film to the required thickness. The pressure between the two rolls forces the film onto the substrate. Further, the film is cooled and solidified by the low temperature of the chill roll. The draw-down ratio, which is one of the characteristic parameters of the extrusion coating process, is the ratio of the die gap to the thickness of the polymer film on the substrate.

Description of extrusion coating process is given, for instance, in Crystalline Olefin Polymers, Part II, by R. A. V. Raff and K. W. Doak (Interscience Publishers, 1964), pages 478 to 484, or Plastics Processing Data Handbook, by Dominick V. Rosato (Chapman & Hall, 1997), pages 273 to 277.

The low density polyethylene of the invention, or the composition of the invention may be used in many applications as for instance in extrusion coating and/or extrusion lamination.

An embodiment of the present invention discloses an article e.g. an extrusion article, for example, an extrusion coating article or an extrusion lamination article, film blowing article, film casting article, wire and cable extrusion article, injection moulding article, blow moulding article or pipe extrusion article, comprising the low density polyethylene of the present invention, or the composition of the present invention.

According to the invention an extrusion article and/or an extrusion lamination article is disclosed which comprises the low density polyethylene of the invention, or the composition of the invention.

Further, also according to the invention the article may comprise a substrate and at least one extrusion coated layer based on the low density polyethylene of the invention, or the composition of the invention.

As mentioned above the substrate is extrusion coated and thus at least one surface of the substrate is coated. It is however within the scope of the invention that both sides of the substrate, i.e. the outer and inner surface (side) of the substrate are extrusion coated. It is also within the scope of the invention that the layer based on the low density polyethylene of the invention, or based on the composition of the invention, is in directed contact with the substrate or that between the substrate and the layer based on the low density polyethylene of the invention, or based on the composition of the invention, at least one further layer is inserted, like an adhesive layer. Also included are embodiments in which the layer based on the low density polyethylene of the invention, or based on the composition of the invention, has been subjected to ozone treatment or flame treatment and/or the substrate has been subjected to corona treatment, respectively, for improving the adhesion between the layer based on the low density polyethylene of the invention, or based on the composition of the invention, and the substrate.

The layer based on the low density polyethylene of the invention, or based on the composition of the invention, comprised in the extrusion coated substrate has preferably a thickness in the range of 5 to 1000 μm, more preferably in the range of 10 to 100 μm. The specific thickness will be selected according to the nature of the substrate, its expected subsequent handling conditions and, most importantly, the subsequent use of the end product. The thickness of the substrate may generally be chosen freely and has no effect on the coating process. It can typically be from 1 to 1000 μm. e.g. 5 to 300 μm.

The extrusion coating process is preferably carried out using conventional extrusion coating techniques. Hence, the low density polyethylene of the invention, or the composition of the invention, is fed to an extruding device. From the extruder the melt of the low density polyethylene of the invention, or of the composition of the invention, is passed through a flat die to the substrate to be coated. Due to the distance between the die lip and the nip, the molten plastic is oxidized in the air for a short period, usually leading to an improved adhesion between the coating and the substrate. The coated substrate is cooled on a chill roll. Coating layer can be post corona treated to make it suitable for e.g. printing or glueing. Afterwards web edges can be trimmed and web can be wound up. The die width typically depends on the size of the extruder used. Thus, with 90 mm extruders the width may suitably be within the range of 600 to 1200 mm, with 115 mm extruders from 900 to 2500 mm, with 150 mm extruders from 1000 to 4000 mm and with 200 mm extruders from 3000 to 5000 mm. It is also possible to employ a coating line with at least two extruders to make it possible to produce multilayered coatings with different polymers. It is also possible to have arrangements to treat the melt of the low density polyethylene of the invention, or of the composition of the invention, exiting the die to improve adhesion, e.g. by ozone treatment, and the substrate with corona treatment or flame treatment. For the corona treatment, for instance the substrate is passed between two conductor elements serving as electrodes, with such a high voltage, usually an alternating voltage (about 10000 V and 10000 Hz), being applied between the electrodes that spray or corona discharges can occur.

A further embodiment of the invention discloses a method for an extrusion coating process, which method comprises extrusion coating a flat substrate by extruding the low density polyethylene of the invention, or the composition of the invention, in a molten state through a flat die onto said substrate.

With the method for the extrusion coating process which method comprises extruding the low density polyethylene of the invention, it has surprisingly been shown to be possible to utilize a low density polyethylene of a tubular reactor origin in an extrusion coating process and to achieve good neck-in properties which is usually poor for a traditionally produced tubular LDPE.

A further embodiment discloses an article, e.g. an extrusion article, comprising at least one layer of the low density polyethylene of the invention, or at least one layer of the composition of the invention.

An object of the invention is use of a low density polyethylene of the present invention, or use of a composition comprising the low density polyethylene of the present invention, in, for example, extrusion coating, extrusion lamination, film blowing, film casting, wire and cable extrusion, injection moulding, blow moulding or pipe extrusion.

A further object of the invention is use of a low density polyethylene of the present invention, or use of a composition comprising the low density polyethylene of the present invention, in extrusion coating and/or extrusion lamination.

DESCRIPTION OF ANALYTICAL METHODS

Molecular Weights, Molecular Weight Distribution (Mn, Mw, MWD)—GPC

A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used.

3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 µL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. ($c_{160° C.}$) was determined in the following way.

$$c_{160° C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by C. Jackson and H. G. Barth (C. Jackson and H. G. Barth, "Molecular Weight Sensitive Detectors" in: Handbook of Size Exclusion Chromatography and related techniques, C.-S. Wu, 2$^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i / M_i)} \quad (3)$$

For a constant elution volume interval $\Delta V_i$, where $A_i$ and $M_i$ are the chromatographic peak slice area and polyolefin molecular weight (MW) determined by GPC-LS.

Melt Flow Rate

Melt flow rate of the low density polyethylene was determined according to ISO 1133 at 190° C. under a load of 2.16 kg (MFR). The melt flow rate is that quantity of polymer in grams which the test apparatus standardised to ISO 1133 extrudes within 10 minutes at a temperature of 190° C. under a load of 2.16 kg.

Storage Modulus (G')

Dynamic Shear Measurements (Frequency Sweep Measurements)

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively $\omega$ is the angular frequency $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0} \cos\delta \, [Pa] \quad (3)$$

$$G'' = \frac{\sigma_0}{\gamma_0} \sin\delta \, [Pa] \quad (4)$$

$$G^* = G' + iG'' \, [Pa] \quad (5)$$

$$\eta^* = \eta' - i\eta'' \, [Pa \cdot s] \quad (6)$$

$$\eta' = \frac{G''}{\omega} \, [Pa \cdot s] \quad (7)$$

$$\eta'' = \frac{G'}{\omega} \, [Pa \cdot s] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$$EI(x)=G' \text{ for } (G''=x \text{ kPa})[\text{Pa}] \quad (9)$$

For example, the EI(5 kPa) is the defined by the value of the storage modulus G', determined for a value of G" equal to 5 kPa.

References:

[1] Rheological characterization of polyethylene fractions" Heino, E. L., Lehtinen, A., Tanner J., Seppala, J., Neste Oy, Porvoo, Finland, Theor. Appl. Rheol., Proc. Int. Congr. Rheol., 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

Quantification of Microstructure by NMR Spectroscopy

Quantitative nuclear-magnetic resonance (NMR) spectroscopy was used to quantify the content of unsaturated groups present in the polymers.

Quantitative $^1$H NMR spectra recorded in the solution-state using a Bruker Advance III 400 NMR spectrometer operating at 400.15 MHz. All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$) using approximately 3 mg of Hostanox O3 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups.{he10a, busico05a} All chemical shifts were internally to the signal resulting from the residual protonated solvent at 5.95 ppm.

Characteristic signals corresponding to the presence of terminal vinyl groups (R—CH=CH$_2$) were observed and the amount of vinylidene groups quantified using the integral of the coupled terminal Va and Vb protons at 4.95, 4.98 and 5.00 and 5.05 ppm respectively accounting for the number of reporting sites per functional group:

$N\text{vinyl}=(IVa+IVb)/2$

The content of vinyl groups was calculated as the fraction of vinyl group in the polymer with respect to the total number of carbons present:

$U\text{vinyl}=N\text{vinyl}/C\text{total}$

Characteristic signals corresponding to the presence of internal vinylidene groups (RR'C=CH$_2$) were observed and the amount of vinylidene groups quantified using the integral of the two D terminal protons at 4.74 ppm accounting for the number of reporting sites per functional group:

$N\text{vinylidene}=ID/2$

The content of vinylidene groups was calculated as the fraction of vinlylidine group in the polymer with respect to the total number of carbons present:

$U\text{vinylidene}=N\text{vinylidene}/C\text{total}$

Characteristic signals corresponding to the presence of internal cis-vinylene groups (E-RCH=CHR') were observed and the amount of cis-vinylene groups quantified using the integral of the two C protons at 5.39 ppm accounting for the number of reporting sites per functional group:

$N\text{cis}=IC/2$

The content of cis-vinylene groups was calculated as the fraction of cis-vinlylene group in the polymer with respect to the total number of carbons present:

$U\text{cis}=N\text{cis}/C\text{total}$

Characteristic signals corresponding to the presence of internal trans-vinylene groups (Z—RCH=CHR') were observed and the amount of trans-vinylene groups quantified using the integral of the two T protons at 5.45 ppm accounting for the number of reporting sites per functional group:

$N\text{trans}=IT/2$

The content of trans-vinylene groups was calculated as the fraction of trans-vinylene group in the polymer with respect to the total number of carbons present:

$U\text{trans}=N\text{trans}/C\text{total}$

The total amount of carbon was calculated from the bulk aliphatic integral between 2.85 and −1.00 accounting for the number of reporting nuclei and compensation for sites relating to unsaturation not including in this region:

$C\text{total}=(\frac{1}{2})*(I\text{aliphatic}+N\text{vinyl}+N\text{vinylidene}+N\text{cis}+N\text{trans})$ The total amount of unsaturated group was calculated as the sum of the individual observed unsaturated groups and thus also reported with respect to the total number of carbons present:

$U\text{total}=U\text{vinyl}+U\text{vinylidene}+U\text{cis}+U\text{trans}$

The unsaturation content is given as amount of unsaturated group/100 kC where 100 kC means 100000 carbons.

The relative content of a specific unsaturated group (x) is reported as the fraction or percentage of a given unsaturated group with respect to the total amount of unsaturated groups:

$[Ux]=Ux/U\text{total}$

References he10a

He, Y., Qiu, X, and Zhou, Z., Mag. Res. Chem. 2010, 48, 537-542.

busico05a

Busico, V. et. al. Macromolecules, 2005, 38 (16), 6988-6996

EXAMPLES

Low density polyethylene was produced by radical polymerization in a three reaction zone, front-feed tubular reactor. Chain transfer agent used was propylene and propionic aldehyde. The pressure in the reactor was between 200- 250 MPa and the peak temperatures were in the range of 250 to 320° C.

The initiator mixture used in all the experiments was composed of the following radical initiators (The 0.1 hours half life temperature (T½) given for each radical initiator). The initiators were dissolved in isododecane. Content of each initiator in each reaction zone is given in Table 1, "Zone" in Table 1 means reaction zone.

Initiator A (T½ 0.1 h at 75-90° C. in chlorobenzene), Initiator B (T½ 0.1 h at 80-95° C. in chlorobenzene), Initiator C (T½ 0.1 h at 105-125° C. in chlorobenzene), Initiator D (T½ 0.1 h at 125-140° C. in chlorobenzene), Initiator E (T½ 0.1 h at 130-145° C. in chlorobenzene) and Initator F (T½ 0.1 h at 155-175° C. in chlorobenzene).

TABLE 1

| Initiator | Zone 1 (wt-%) | Zone 2 (wt-%) | Zone 3 (wt-%) |
|---|---|---|---|
| A | 4-6 | 0-1 | 0-1 |
| B | 4-6 | 0-1 | 0-1 |
| C | 5-7 | 3-5 | 20-40 |
| D | 1-3 | 5-7 | 0-2 |
| E | 3-5 | 5-7 | 0-2 |
| F | 2-4 | 4-6 | 0-2 |

Material A
Innovative Example

The inlet temperature of the reaction mixture into the first reaction zone (reaction zone 1) was 124° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 2 were reached. The polymerization yielded about 9890 kg polymer/h.

TABLE 2

| Reaction zone | Peak temperature (° C.) |
|---|---|
| 1 | 314 |
| 2 | 311 |
| 3 | 274 |

The chain transfer agent was added in such amounts that the polymer formed, i.e. the low density polyethylene of the present invention, had a melt flow rate of about 4.5 g/10 min according to ISO 1133 (190° C., 2.16 kg).

The density of the polymer produced, i.e. the low density polyethylene of the present invention, was about 917 kg/m$^3$ according to ISO 1183.

The weight average molecular weight (Mw) of the polymer produced, i.e. the low density polyethylene of the present invention, was 209000 g/mol.

Material B
Innovative Example

The inlet temperature of the reaction mixture into the first reaction zone (reaction zone 1) was 134° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 3 were reached. The polymerization yielded about 9740 kg polymer/h.

TABLE 3

| Reaction zone | Peak temperature (° C.) |
|---|---|
| 1 | 314 |
| 2 | 310 |
| 3 | 273 |

The chain transfer agent was added in such amounts that the polymer formed, i.e. the low density polyethylene of the present invention, had a melt flow rate of about 4.9 g/10 min according to ISO 1133 (190° C., 2.16 kg).

The density of the polymer produced, i.e. the low density polyethylene of the present invention, was about 917 kg/m$^3$ according to ISO 1183.

The weight average molecular weight (Mw) of the polymer produced, i.e. the low density polyethylene of the present invention, was 216000 g/mol.

Material C
Innovative Example

The inlet temperature of the reaction mixture into the first reaction zone (reaction zone 1) was 135° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 4 were reached. The polymerization yielded about 9380 kg polymer/h.

TABLE 4

| Reaction zone | Peak temperature (° C.) |
|---|---|
| 1 | 309 |
| 2 | 302 |
| 3 | 268 |

The chain transfer agent was added in such amounts that the polymer formed, i.e. the low density polyethylene of the present invention, had a melt flow rate of about 4.6 g/10 min according to ISO 1133 (190° C., 2.16 kg).

The density of the polymer produced, i.e. the low density polyethylene of the present invention, was about 918 kg/m$^3$ according to ISO 1183.

The weight average molecular weight (Mw) of the polymer produced, i.e. the low density polyethylene of the present invention, was 200000 g/mol.

Material D
Innovative Example

The inlet temperature of the reaction mixture into the first reaction zone (reaction zone 1) was 134° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 5 were reached. The polymerization yielded 9364 kg polymer/h.

TABLE 5

| Reaction zone | Peak temperature (° C.) |
|---|---|
| 1 | 316 |
| 2 | 307 |
| 3 | 268 |

The chain transfer agent was added in such amounts that the polymer formed, i.e. the low density polyethylene of the present invention, had a melt flow rate of about 5.3 g/10 min according to ISO 1133 (190° C., 2.16 kg).

The density of the polymer produced, i.e. the low density polyethylene of the present invention, was about 918 kg/m$^3$ according to ISO 1183.

The weight average molecular weight (Mw) of the polymer produced, i.e. the low density polyethylene of the present invention, was 237000 g/mol.

Material E
Innovative Example

The inlet temperature of the reaction mixture into the first reaction zone (reaction zone 1) was 133° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 6 were reached. The polymerization yielded about 9193 kg polymer/h.

TABLE 6

| Reaction zone | Peak temperature (° C.) |
| --- | --- |
| 1 | 316 |
| 2 | 308 |
| 3 | 265 |

The chain transfer agent was added in such amounts that the polymer formed, i.e. the low density polyethylene of the present invention, had a melt flow rate of about 5.7 g/10 min according to ISO 1133 (190° C., 2.16 kg).

The density of the polymer produced, i.e. the low density polyethylene of the present invention, was about 918 kg/m$^3$ according to ISO 1183.

The weight average molecular weight (Mw) of the polymer produced, i.e. the low density polyethylene of the present invention, was 203000 g/mol.

Material F
Innovative Example

The inlet temperature of the reaction mixture into the first reaction zone (reaction zone 1) was 134° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 7 were reached. The polymerization yielded about 8625 kg polymer/h.

TABLE 7

| Reaction zone | Peak temperature (° C.) |
| --- | --- |
| 1 | 312 |
| 2 | 279 |
| 3 | 254 |

The chain transfer agent was added in such amounts that the polymer formed, i.e. the low density polyethylene of the present invention, had a melt flow rate of about 5.4 g/10 min according to ISO 1133 (190° C., 2.16 kg).

The density of the polymer produced, i.e. the low density polyethylene of the present invention, was about 919 kg/m$^3$ according to ISO 1183.

The weight average molecular weight (Mw) of the polymer produced, i.e. the low density polyethylene of the present invention, was 196000 g/mol.

Material G
Comparative Example

The inlet temperature of the reaction mixture into the first reaction zone (reaction zone 1) was 152° C. The initiator mixture was fed in such amounts to reach the peak temperatures in Table 8. About 27 000 kg/h of ethylene, i.e. the reaction mixture, was fed to the front of the reactor, i.e. into the first reaction zone of the reactor. The polymerization yielded about 8960 kg polymer/h.

TABLE 8

| Reaction zone | Peak temperature (° C.) |
| --- | --- |
| 1 | 304 |
| 2 | 302 |
| 3 | 264 |

The chain transfer agent was added in such amounts that the polymer formed had a melt flow rate of about 4.0 g/10 min according to ISO 1133 (190° C., 2.16 kg).

The density of the polymer produced was about 920 kg/m$^3$ according to ISO 1183.

The weight average molecular weight Mw was 174000 g/mol.

Material H
Comparative Example

The inlet temperature of the reaction mixture into the first reaction zone (reaction zone 1) was 134° C. About 27 000 kg/h of ethylene, i.e. the reaction mixture, was fed to the front of the reactor, i.e. into the first reaction zone of the reactor. The initiator mixture was fed to all three reaction zones in such amounts to reach the peak temperatures in Table 9. The polymerization yielded about 9265 kg polymer/h.

TABLE 9

| Reaction zone | Peak temperature (° C.) |
| --- | --- |
| 1 | 307 |
| 2 | 311 |
| 3 | 258 |

The chain transfer agent was added in such amounts that the polymer formed had a melt flow rate of about 3.0 g/10 min according to ISO 1133 (190° C., 2.16 kg).

The density of the polymer produced was about 918 kg/m$^3$ according to ISO 1183.

The weight average molecular weight Mw was 180000 g/mol.

Material I
Comparative Example—Produced with Conventional Techniques

A low density polyethylene was produced by radical polymerization in a three zone, front-feed tubular reactor. Chain transfer agents used were a mixture of propionic aldehyde and propylene. The pressure in the reactor was between 220-285 MPa and the peak temperatures were in the range of 250 to 315° C.

The radical initiator cocktail used was composed of the following radical initiators (The 0.1 hours half life temperature (T½) given for each radical initiator):
Initiator AI (T½ 0.1 h at 75-90° C. in chlorobenzene),
Initiator BI (T½ 0.1 h at 80-95° C. in chlorobenzene,
Initiator CI (T½ 0.1 h at 105-125° C. in chlorobenzene),
Initiator DI (T½ 0.1 h at 125-140° C. in chlorobenzene) and
Initator EI (T½ 0.1 h at 155-175° C. in chlorobenzene).

Three mixtures, one for each reaction zone, of organic peroxides dissolved in isododecane were used as radical initiators.

Zone 1 (Initiator AI 20-35 kg /ton mixture, Initiator BI 15-25 kg /ton mixture, Initiator CI 20-35 kg/ton mixture, Initiator DI 15-35 kg/ton mixture, Initiator EI 10-40 kg/ton mixture)

Zone 2 (Initiator AI 15-35 kg /ton mixture, Initiator BI 15-35 kg /ton mixture, Initiator CI 15-35 kg/ton mixture, Initiator DI 15-35 kg/ton mixture, Initiator EI 20-40 kg/ton mixture)

Zone 3 (Initiator AI 0-20 kg /ton mixture, Initiator BI 5-20 kg /ton mixture, Initiator CI 0-20 kg/ton mixture, Initiator DI 10 -35 kg/ton mixture, Initiator EI 10-40 kg/ton mixture)

About 27 000 kg/h of ethylene were fed to the front of the reactor. The polymerization yielded about 7700 kg polymer/h. The added active oxygen was 0.04 kg active oxygen/ton polyethylene. The chain transfer agent was added in such amounts that the polymer formed had a melt flow rate of about 5 g/10 min according to ISO 1133 (190° C., 2.16 kg).

The density of the polymer produced was about 920 kg/m³ according to ISO 1183.

Material I was produced with conventional techniques.

basis weight of 10 g/m². The temperature of the polymer composition melt, i.e. Materials A to I, was set to 320° C.

Draw-down testings of the Materials A to I were performed by increasing the line speed stepwise until web instability occurred. Coating weight (amount of polymer on substrate in g/m²) was kept at 10 g/m². Web instability was

TABLE 10

| Material | Active oxygen/ ton PE | Storage modulus (G'(5 kPa)) (Pa) | Zone 1 inlet temperature (° C.) | MFR (2.16 kg/ 10 min) | Mw (g/mol) | Vinylidene content/ 100 kC | Neck-in at 400 m/min (mm) | Mw/Mn |
|---|---|---|---|---|---|---|---|---|
| A | 0.23 | 3570 | 124 | 4.5 | 209000 | 31 | 72 | 25.6 |
| B | 0.25 | 3500 | 134 | 4.9 | 216000 | 30 | 73 | 24.5 |
| C | 0.25 | 3350 | 135 | 4.6 | 200000 | 26 | 79 | 22.1 |
| D | 0.25 | 3470 | 134 | 5.3 | 237000 | 33 | 75 | 14.8 |
| E | 0.33 | 3480 | 133 | 5.7 | 203000 | 32 | 76 | 14.5 |
| F | 0.30 | 3280 | 134 | 5.4 | 196000 | 24 | 86 | 15.1 |
| G | 0.07 | 3100 | 152 | 4.0 | 174000 | 18 | 95 | 9.6 |
| H | 0.13 | 3525 | 134 | 3.0 | 180000 | — | Not possible to run at 400 m/min | 21.1 |
| I | 0.04 | 2650 | — | 4.8 | | 13 | 114 | 6.6 |

The processability is improved with increased active oxygen feed. At higher active oxygen feed the material produced in a tubular reactor surprisingly has a draw-down neck-in balance similar to the draw-down neck-in balance that is known from traditional extrusion coating materials produced in autoclave reactor, see Table 10.

Figure 1:
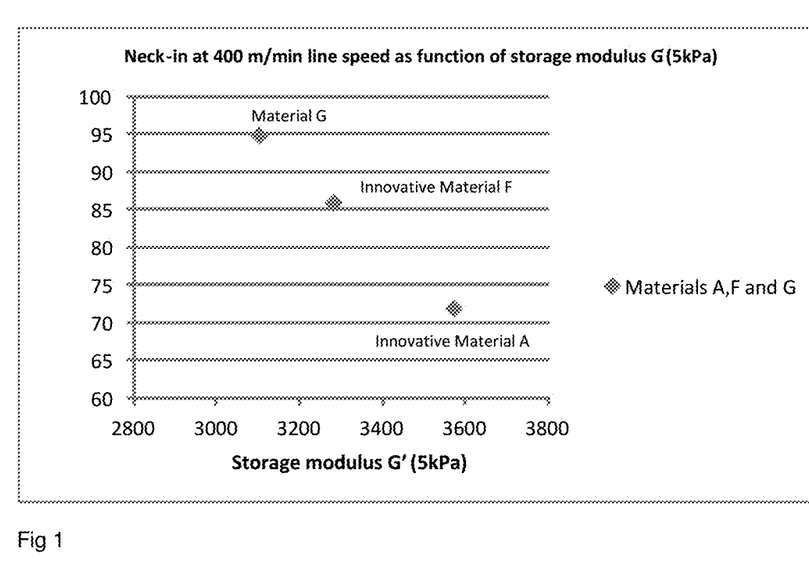
FIG. 1 describes the neck-in of Material A, F and G at 400 m/min line speed as function of storage modulus G', measured at a loss modulus G" of 5 kPa.

The storage modulus G', measured at a loss modulus G" of 5 kPa, of the low density polyethylene of the present invention, e.g. Materials A to F, produced with an amount of used active oxygen which is at least 5 times the conventionally used amount (see Example I), is higher than for Materials G, H and I. Example I is produced with conventional techniques, i.e. an conventional amount of active oxygen is used, see Table 10. From the examples, see Table 10 and FIG. 1, it is also clear that neck-in is reduced by increased G' (5 kPa).

Figure 2:
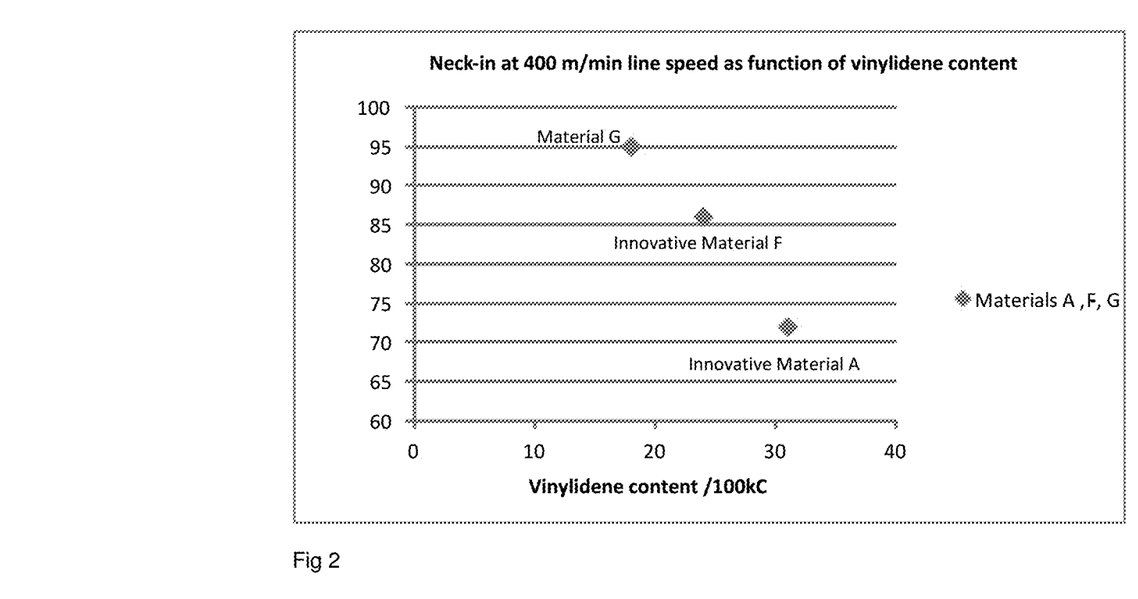
FIG. 2 describes the neck-in of Material A, F and G at 400 m/min line speed as function of vinylidene content.

Furthermore, the vinylidene content of Material A is the higher than the other examples, i.e. Material B-H, produced with higher inlet temperatures. From the examples, see Table 10 and FIG. 2, it is also clear that neck-in is even further reduced by increased G' (5 kPa) of Material A.

When comparing the actual peak temperatures of Materials A-H it is clear that it is not high peak temperature that is giving the advantageous properties, e.g. the increased elasticity index G' (5 kPa), the increased vinylidene content and an increased Mw/Mn, of Material A. This further shows the importance of a low inlet temperature into the first reaction zone of the reactor to get the advantageous properties of Material A.

Examples Extrusion Coating

Trial

Extrusion coating runs were made on Beloit coextrusion coating line. It had Peter Cloeren's EBR die and a five layer feed block. The width of the line die opening was 850-1000 mm, maximum width of the substrate is 800 mm and the line speed was maintained at 100 m/min.

The extrusion coating behaviour of the polymer compositions, i.e. Materials A to I, were analysed.

In the coating line above UG Kraft paper having a basis weight of 70 g/m² was coated with a layer of a polymer composition according to the present invention having a monitored visually through the amount of edge weaving. Samples were marked into the coated web at 100 m/min intervals, starting at 100 m/min until web instability occurred. Samples were taken out from the reel and neck-in and coating weight were measured afterwards. Neck-in is defined as the difference in width of the die opening and width of the coating on the substrate. Coating weight was measured from 5 positions across the web.

The invention claimed is:

1. A low density polyethylene having a melt flow rate (MFR) according to ISO 1133 (190° C., 2.16 kg) which is higher than 4.0 g/10 min, a storage modulus G', measured at a loss modulus G" of 5 kPa, which is above 3000 Pa, a vinylidene content which is at least 24/100 k C, and a molecular weight distribution Mw/Mn which is at least 22 and not higher than 30.

2. A low density polyethylene according to claim 1, wherein the low density polyethylene is produced in a tubular reactor.

3. A low density polyethylene according to claim 1, wherein the low density polyethylene has a vinylidene content which is at least 28/100 k C.

4. A composition comprising the low density polyethylene according to claim 1, wherein the composition, optionally, may be useful in extrusion coating.

5. A composition according to claim 4, which comprises the low density polyethylene in an amount of 5 to 40 wt %, based on the total weight of the composition, and may further comprise at least one olefin polymer prepared in the presence of a transition metal catalyst, which at least one olefin polymer may be selected from homo- or copolymers of polyethylene, polypropylene or poly-1-butene.

6. A process for production of the low density polyethylene according to claim 1, in a tubular reactor by radical initiated polymerization under a pressure from 1000 to 3000 bar where the polymerization is performed by reacting a reaction mixture, comprising ethylene monomers, under action of one or more radical initiators, such as peroxides, oxygen or combinations thereof, wherein the amount of used radical initiators, i.e. the amount of used active oxygen, is at least 0.20 kg/ton PE, and, optionally, wherein inlet temperature of the reaction mixture into the first reaction zone of the reactor is 135° C. or lower.

7. A process according to claim 6, wherein a radical initiator cocktail is used, which is composed of the following radical initiators, where the 0.1 hours half life temperature ($T\frac{1}{2}$) is given for each radical initiator: Initiator A ($T\frac{1}{2}$ 0.1 h at 75-90° C. in chlorobenzene), Initiator B ($T\frac{1}{2}$ 0.1 h at 80-95° C. in chlorobenzene), Initiator C ($T\frac{1}{2}$ 0.1 h at 105-125° C. in chlorobenzene), Initiator D ($T\frac{1}{2}$ 0.1 h at 125-140° C. in chlorobenzene), Initiator E ($T\frac{1}{2}$ 0.1 h at 130-145° C. in chlorobenzene) and Initiator F ($T\frac{1}{2}$ 0.1 h at 155-175° C. in chlorobenzene).

8. A method for an extrusion coating process, which method comprises extrusion coating a flat substrate by extruding the low density polyethylene according to claim 1.

9. A method for an extrusion coating process, which method comprises extrusion coating a flat substrate by extruding the composition according to claim 4, in a molten state through a flat die onto said substrate.

10. An article selected from an extrusion article, an extrusion coating article or an extrusion lamination article, film blowing article, film casting article, wire and cable extrusion article, injection molding article, blow molding article or pipe extrusion article, comprising the low density polyethylene according to claim 1.

11. An article selected from an extrusion article, an extrusion coating article or an extrusion lamination article, film blowing article, film casting article, wire and cable extrusion article, injection molding article, blow molding article or pipe extrusion article, comprising the composition according to claim 4.

* * * * *